US010370519B2

(12) United States Patent
Rhoades et al.

(10) Patent No.: US 10,370,519 B2
(45) Date of Patent: Aug. 6, 2019

(54) MATTING PASTE COMPOSITION

(71) Applicant: Akzo Nobel Coatings International B.V., Arnhem (NL)

(72) Inventors: Toolika Rhoades, Troy, MI (US); Justin Blair, Lincoln Park, MI (US)

(73) Assignee: Akzo Nobel Coatings International B.V., Arnhem (NL)

( * ) Notice: Subject to any disclaimer, the term of this patent is extended or adjusted under 35 U.S.C. 154(b) by 0 days.

(21) Appl. No.: 15/242,884

(22) Filed: Aug. 22, 2016

(65) Prior Publication Data

US 2016/0355692 A1 Dec. 8, 2016

Related U.S. Application Data

(63) Continuation of application No. 14/414,157, filed as application No. PCT/EP2013/065368 on Jul. 22, 2013, now abandoned.

(60) Provisional application No. 61/674,949, filed on Jul. 24, 2012.

(30) Foreign Application Priority Data

Oct. 31, 2012 (EP) .................................... 12190711

(51) Int. Cl.

| | |
|---|---|
| ***C08K 5/17*** | (2006.01) |
| ***C08K 3/36*** | (2006.01) |
| ***C08K 5/3435*** | (2006.01) |
| ***C08K 5/3475*** | (2006.01) |
| ***C09D 175/04*** | (2006.01) |
| ***C09D 17/00*** | (2006.01) |
| ***C09D 7/42*** | (2018.01) |
| ***C09D 7/48*** | (2018.01) |

(52) U.S. Cl.

CPC .................. *C08K 5/17* (2013.01); *C08K 3/36* (2013.01); *C08K 5/3435* (2013.01); *C08K 5/3475* (2013.01); *C09D 7/42* (2018.01); *C09D 7/48* (2018.01); *C09D 17/00* (2013.01); *C09D 175/04* (2013.01)

(58) Field of Classification Search

None

See application file for complete search history.

(56) References Cited

U.S. PATENT DOCUMENTS

| | | | | |
|---|---|---|---|---|
| 5,432,221 | A * | 7/1995 | Polaski ................. | C08F 212/12 524/310 |
| 5,759,630 | A | 6/1998 | Vosskuhl et al. | |
| 6,410,147 | B1 | 6/2002 | Chung et al. | |
| 6,686,412 | B1 | 2/2004 | Berschel et al. | |
| 8,197,654 | B2 | 6/2012 | Hickenboth et al. | |
| 2005/0027881 | A1 | 2/2005 | Figueira et al. | |
| 2006/0089452 | A1 | 4/2006 | Schneider et al. | |
| 2010/0279123 | A1 | 11/2010 | Yokoyama et al. | |
| 2012/0053277 | A1 | 3/2012 | Saliya et al. | |

FOREIGN PATENT DOCUMENTS

| | | | |
|---|---|---|---|
| DE | 19810900 | A1 | 9/1999 |
| DE | 102009045104 | A1 | 9/2009 |
| EP | 1088037 | B1 | 4/2001 |
| GB | 723427 | | 2/1955 |
| GB | 1379861 | | 1/1975 |
| JP | 70008505 | B | 4/1966 |
| WO | 98/58030 | A1 | 12/1998 |
| WO | 2011/143277 | A1 | 11/2011 |

OTHER PUBLICATIONS

Vertellus, product information sheet for AA USP Castor Oil, 2006.*
Search Report for EP application No. 12190711.7 dated Jan. 30, 2013.
International Search Report for PCT/EP2013/065368 dated Oct. 29, 2013.
DE 19810900A1—Abstract—machine translation.
JP 70008505-B—Abstract—machine translation.
CAS definition of MMA CAS Registry No. 74-89-5.
CAS definition of MMA CAS Registry No. 51059-14-4.
CAS definition of BMA CAS Registry No. 7631-86-9.

* cited by examiner

*Primary Examiner* — Robert T Butcher
(74) *Attorney, Agent, or Firm* — Pauly, DeVries Smith & Deffner LLC; Nirav P. Patel

(57) ABSTRACT

The invention is directed to a matting paste composition comprising: a) thermoplastic non-hydroxy-functional acrylic resin; b) hindered amine light stabilizer; c) UV absorber; d) amorphous, untreated fumed silica, flattener; and e) one or more organic solvents.

18 Claims, No Drawings

MATTING PASTE COMPOSITION

CROSS-REFERENCE TO RELATED APPLICATIONS

This application is a continuation of U.S. patent application Ser. No. 14/414,157, filed Jan. 12, 2015, which is a is a national stage filing under 35 U.S.C. § 371 of PCT/EP2013/065368, filed Jul. 22, 2013, which claims priority to U.S. Provisional Patent Application No. 61/674,949 filed Jul. 24, 2012, and European Patent Application No. 12190711.7, filed Oct. 31, 2012, the contents of which are incorporated herein by reference in their entireties.

FIELD OF THE INVENTION

The field of the invention relates to matting paste compositions and their use in high solids liquid coating applications. More particularly, it relates to stable matting pastes for use in high solids, liquid coating systems with a wide range of target gloss values.

BACKGROUND OF THE INVENTION

Coating compositions have long been used to produce coatings having desired coating characteristics. For instance, coating compositions have been used to enhance surface appearance, such as providing high gloss or low gloss. For certain applications in vehicle and other industrial applications it is necessary to prepare coatings which result in surfaces with reduced gloss and/or textured surfaces. For example, commercial vehicle bodies and signage parts should have matt surfaces to reduce glare and plastics parts, e.g., external trim parts on vehicles such as bumpers should receive dull and/or textured surfaces. In order to obtain the matt and/or textured surfaces, flatting agents or texture additives are added to the coating compounds. When the applied coating film dries, the flatting agent particles produce a micro-rough surface texture. As a result, the incident light is reflected in a diffuse manner and gives the observer the impression of a matt surface.

The flatting agent particles must be distributed homogeneously in the dry film. The flatting agents and/or texture additives may be incorporated as material in powder or paste form. Conventional flatting agent pastes generally contain, apart from the flatting agents, binders, solvents and optionally additives. By increasing the loading of the flatting agent in a coating composition, the gloss can be reduced. To attain low gloss topcoats, the matting pastes have to be loaded with an excess amount, typically more than 6 weight percent based on the total weight of the composition of the flatting agent in order to achieve reasonable coverage and a low gloss finish. Unfortunately, the flatting agent in these excessively loaded coating compositions tends to coagulate, especially if pyrogenic, untreated fumed silica is used. As a result, the conventional low gloss coatings resulting therefrom have visually unacceptable seedy appearance. Furthermore, the presence of the excessive amount of these flatting agents in a coating composition tends to make the resultant coatings more brittle than conventional coating compositions. Additionally, high loading of flattener may lead to high viscosity, which is difficult to apply. Thus, a need exists for durable low gloss coatings that do not have seedy appearance.

For ecological reasons, low-emission, high-solids thermoset systems are increasingly being used. Adequate flowability is a prerequisite for problem-free handling and good meterability of the high solid coatings. It is difficult to achieve good flowability with the above-mentioned high solids coatings containing flatting agents and/or texture additives because in order to obtain predetermined texture effects or degrees of gloss, the matting paste/coatings must contain such large proportions of texturing and/or flatting agents that the products are pasty and no longer free-flowing, making acceptable processing impossible. Others have attempted to avoid this problem by employing silicas that have minimal or low impact on viscosity, such as untreated or organically treated precipitated silicas or synthetic amorphous silicas. Others have tried to increase flatting, with minimal impact on viscosity, by using silica gels, polymer spheres, incompatible polymers or waxes. However, these type of flatteners are not efficient in flatting high solids thermoset coatings. Due to their high usage in the film, "clarity" of the low gloss coatings is reduced, leading to a "dirtier" or "muddier" appearance.

Furthermore, processability of the matting pastes using VOC exempt solvents like PCBTF, acetone, and/or t-butyl acetate can be difficult. Acetone has very low flash point and is thus hazardous for storage and processing. T-butyl acetate is fast evaporating and it is difficult to spray large surfaces when it is used in high levels. PCBTF is known to have poor solvency characteristics for many binders, especially CABs and certain lacquers. Therefore, VOC compliant Low Gloss Topcoats using matting pastes with superior appearance in terms of film clarity, excellent metal orientation, sag resistance, fast dry, excellent application over large parts, even gloss over the entire surface, gloss consistency under different conditions and film builds and durability has not been feasible.

Attempts have been made to produce low gloss coating using matting pastes with improved handling characteristics. For example, U.S. Pat. No. 6,686,412 teaches the use of thixotropic (meth)acrylic copolymers and/or thixotropic polyesters in the flatting agent paste. It is alleged that using such thixotropic polymers permits pastes to be filled with the required amounts of flatting and/or texturing agents and still result in free-flowing pastes.

Besides handling issues, preparations containing flatting and/or texturing agents generally have the problem that partially dried particles of said preparations or of the coating agents containing them fall from the edge of the coating container back into the liquid coating and may thus lead to pinholing. It is not possible to screen these particles from the liquid coating prior to application since the texturing agent would then be removed too.

Further, coatings containing flatting agents often do not result in a uniform spray pattern. Unsightly patches form, particularly on fairly large surfaces to be painted or coated. Moreover, preparations in paste form can be difficult to keep stable in storage and can exhibit settling and re-agglomeration of untreated, fumed silicas, especially after prolonged storage.

Accordingly, there exists a need to achieve coatings with a matting paste that have good storage stability and result in improved appearance, where there is no hazy sheen and the coating exhibits uniform gloss levels over larger surface areas, without a blotchy appearance.

SUMMARY OF THE INVENTION

It has been found that high solids liquid coating compositions, e.g., greater than 40% solids, can be prepared using matting pastes for spray applications that achieve dried coatings with a range of target gloss values suitable for signage and automotive parts, while avoiding the above mentioned problems.

In one aspect, the invention is directed to a stable matting paste composition for use in high solids liquid coating compositions. In one embodiment, the matting paste composition comprises:

thermoplastic non-hydroxy-functional acrylic resin;
hindered amine light stabilizer;
UV absorber;
amorphous, untreated fumed silica, flattener; and
one or more organic solvents.

In one embodiment, the matting paste composition is substantially free of extender pigments (or fillers). In an embodiment, the matting paste is free of extender pigments. Examples of extender pigments include talc, calcium carbonate, barium sulfate, wollastonite, nepheline syenite, aluminum silicates, feldspar, bentonites, glass spheres, and waxes such as polyethylene, PTFE, carnauba, and silicone and polyamide waxes.

In an embodiment, the matting paste further comprises castor oil, e.g., a triglyceride of 90% ricinoleic acid with MW approximately 900, RI 1.4775, and OH value 164. In other embodiments, the matting paste can comprise low Tg acrylics or polyesters (having a Tg in the range from about 0 to about −50° C.). In embodiments, these acrylics and polyesters can have a (weight average) MW in the range of about 500 to about 10,000. It has been shown that if the matting paste composition according to the invention contains a sufficient amount of such components, i.e., the castor oil or low Tg acrylic or polyester, it can impart self-healing properties in the resulting coating that uses the matting paste composition.

In one embodiment, the thermoplastic non-hydroxy-functional acrylic resin is chosen from MMA and/or MMA/BMA copolymers, having Tg in the range from 50-100° C. In embodiments of the invention, the thermoplastic non-hydroxy-functional acrylic resin has a (weight average) molecular weight in the range from about 50,000 to about 100,000, or from about 60,000 to about 90,000, or from about 65,000 to about 75,000. In one embodiment, the MW is about 70,000. Examples of commercially available acrylic resins useful in the invention are Paraloids® from Rohm & Haas and Nuplex Resins. In one embodiment, the thermoplastic non-hydroxy-functional acrylic resin is Setalux 17-1261 (available from Nuplex Resins). In embodiments of the invention the acrylic resin is present in an amount from about 15 to about 35 wt %, or from about 20 to about 31 wt %, based on total formula weight of matting paste composition.

In embodiments, where matting pastes are intended for use for topcoats, the acrylic resin can be present in an amount from about 20 to about 35 wt %, or from about 25 to about 31 wt %, based on total formula weight of matting paste composition. In embodiments, where matting pastes are intended for use for clearcoats, the acrylic resin can be present in an amount from about 15 to about 30 wt %, or from about 15 to about 25 wt %, based on total formula weight of matting paste composition.

In one embodiment, the hindered amine light stabilizer functions as a wetting/dispersing/stabilizing aid. In one embodiment, the hindered amine light stabilizer is chosen from Bis (1,2,2,6,6-pentamethyl-4-piperidyl) sebacate, methyl (1,2,2,6,6-pentamethyl-4-piperidyl) sebacate, and mixtures thereof. In embodiments of the invention, the hindered amine light stabilizer is present in an amount from about 1.5 to about 8%, or from about 2 to about 6.5%, or about 2 to about 6.1%, based on the total weight of the matting paste composition.

In one embodiment, the UV absorber functions as a wetting/dispersing/stabilizing aid. In one embodiment, the UV absorber is benzotriazol type absorber. In one embodiment, the UV stabilizer is a hydroxy phenylbenzotriazole compound, for example, 2-(2H-benzotriazol-2-yl)-4,6-diterpentyl phenol. In embodiments of the invention, the UV absorber is present in an amount from about 2 to about 8%, or from about 2.5 to about 6.5, or about 2.9 to about 6.1%, based on the total weight of the matting paste composition.

In one embodiment, the flattener is a pyrogenic non-treated fumed silica. Examples of commercially available non-treated silicas useful in the invention are untreated thermal silicas from Evonik. In one embodiment, the pyrogenic non-treated fumed silica is ACEMATT® TS100 (available from Evonik). In embodiments of the invention, the flattener is present in an amount from about 7 to about 13%, or about 7.5 to about 12.5%, or about 7.7 to about 12.1%, based on the total weight of the matting paste composition.

In one embodiment, the organic solvent component is chosen from t-butyl acetate, PCBTF, MAK, EEP, or mixtures thereof. In embodiments of the invention, the organic solvent is present in an amount from about 40 to about 60%, or from about 44% to about 56%, based on the total weight of the matting paste composition.

In another aspect, a liquid coating composition can be formed by mixing the matting paste composition with a pigmented module and a crosslinker module. In one embodiment, the pigmented module comprises a color and/or effect pigment, one or more hydroxyl-functional film forming resins, and organic solvent. The crosslinker module can include a polyisocyanate crosslinker. In embodiments of the invention, the liquid coating composition obtained after mixing can be applied as reduced gloss topcoat on signage and automotive parts.

In another aspect, a liquid coating can be formed by mixing the matting paste composition with a non-pigmented module and a crosslinker module. The non-pigmented module comprises of one or more—hydroxy functional film forming resins, and organic solvent. The crosslinker module can include a polyisocyanate crosslinker. In embodiments of the invention, the liquid coating composition obtained after mixing can be applied as reduced gloss clearcoat over a pigmented basecoat or topcoat on signage and automotive parts.

Coatings prepared with the matting paste, as described above, have an improved appearance, i.e. no hazy sheen and uniform gloss levels, even over larger surface areas, and no blotchy appearance. In addition, the matting paste has improved storage stability and mixing with the pigmented module is easy.

In embodiments where the matting paste further comprises castor oil, it was found that the resulting coatings have very good mar resistance of the coating, can be recoated easily, and can exhibit self healing properties.

Additional objects, advantages and novel features will be apparent to those skilled in the art upon examination of the description that follows.

DETAILED DESCRIPTION OF THE INVENTION

In embodiments of the invention, in addition to the thermoplastic resin, the matting paste composition includes both a benzotriazole UV absorber and a hindered-amine light stabilizer (HALS). In addition to improving UV light durability of a coating, the UV absorber and HALS can function as wetting and dispersing aids, and as stabilizing agents for the amorphous, untreated silica flattener.

Applicants have discovered that use of these classes of light stabilizing compounds and UV absorbers in accordance with the present invention allows for much higher loading of the untreated flattener, while maintaining the stability of the resulting matting paste composition, than was previously possible. Thus, the matting paste composition according to the present invention is stable, such that flattener re-agglomeration is minimized.

Applicants have further discovered that wetting and dispersing aids typically used in coatings, such as pigment wetting and dispersing additives, such as polyether modified polysiloxane, such as from Byk Chemie, were found to be insufficient to achieve the flattener loading and performance properties achieved by operating in accordance with the present invention. Thus, in embodiments of the invention, the matting paste composition contains lower amounts of such typical additives, e.g., less than 5 wt %, or less than 3 wt %, or less than 2 wt %, or less than 1 wt %, of such additives. In embodiments, the matting paste composition is substantially free of, or free of typical wetting and dispersing aids.

Coatings made using the matting paste composition according to the present invention have been found to have excellent mar resistance without the use of polyethylene type waxes. Thus, in embodiments, the matting paste composition is substantially free of, e.g., less than 1 wt % or less than 0.5 wt %, or are free of polyethylene, PTFE, carnuba, polyamide or silicone type waxes.

Extender pigments, such as talc and calcium carbonate, are typically used in matting pastes for high solids coatings for the purpose of easy mixing with the color pigment dispersions and maintaining good application properties. However, extender pigments tend to compromise final appearance of low gloss films. However, coatings made using of the matting paste composition according to the present invention have been found to have a uniform gloss, even on large parts, and metallic appearance is not "muddy" and sparkle is maintained, ail while maintaining good mixing with the color pigment dispersions. Thus, in embodiments, the matting paste composition is substantially free of, or free of extender pigments.

In embodiments of the invention, the matting paste composition is used with conventional liquid coatings, for example, useful for coating vehicles or signage. The term "liquid coatings" can include any coating compositions known to or developed by those skilled in the art and can include a two-pack coating composition, also known as "2K coating composition"; a one-pack or 1 K coating composition; a chemical curable coating composition having a crosslinkable component and a crosslinking component; a radiation curable coating composition, such as a UV curable coating composition or an E-beam curable coating composition; a mono-cure coating composition that can be cured by one mechanism, such as chemical curing or radiation curing; a dual-cure coating composition that can be cured by two curing mechanisms, such as both chemical curing and radiation curing; a lacquer coating composition; a water-borne coating composition or aqueous coating composition; a solvent borne coating composition; or any other coating compositions known to or developed by those skilled in the art. The coating composition can be formulated as a primer, a basecoat, or a color coat composition and can comprise dyes, pigments or effect pigments. The coating composition can also be formulated as a clearcoat composition. Clearcoat composition can further comprise certain pigments having same or similar optical properties, such as same or similar refractive index as the cured clearcoat. A coating composition can comprise one or more volatile organic compounds (VOCs).

The term "two-pack coating composition", also known as 2K coating composition, refers to a coating composition having two packages that are stored in separate containers and sealed to increase the shelf life of the coating composition during storage. The two packages are mixed just prior to use to form a pot mix, which has a limited pot life, typically ranging from a few minutes (15 minutes to 45 minutes) to a few hours (4 hours to 8 hours). The time it takes for the viscosity of the pot mix to increase to such point where spraying becomes ineffective, generally a two-fold increase in viscosity, is referred to as "pot life". The pot mix can be applied as a layer of a desired thickness on a substrate. After application, the layer dries and cures at ambient or at elevated temperatures to form a coating layer having desired coating properties, such as, adhesion, high gloss, mar-resistance and resistance to environmental etching.

In embodiments of the invention the matting paste composition can be used to achieve different target gloss levels. The target coating can have a target range of gloss value in a range of from "flat" to "high gloss" using descriptive gloss values. In one example, the target range of gloss value can be "flat". In another example, the target range of gloss value can be "satin". In yet another example, the target range of gloss value can be "semi". In further another example, the target range of gloss value can be "high gloss". The target coating can have a target range of gloss value in a range of from 0[deg.]-100[deg.] at a certain angle using numeric gloss values.

In a further example, the target range of gloss value can be in a range of from 0°-100° GU at 60° angle. In an even further example, the target range of gloss value can be in a range of from 10°-45° GU at 60° angle. In yet a further example, the target range of gloss value can be in a range of from 45°-65° GU at 60° angle. In yet a further example, the target range of gloss value can be in a range of from 65°-100° GU at 60° angle. The descriptive gloss values and the numeric gloss values can be correlated. For example, a flat gloss value can be correlated to 0°-10° GU at 60° angle, a satin gloss value can be correlated to 10°-45° GU at 60° angle, a semi gloss value can be correlated to 45°-65° GU at 60° angle, and a high gloss can be correlated to 65°-100° GU at 60° angle. Other correlations among the descriptive gloss values and numeric gloss values can also be suitable.

In one aspect, the invention is directed to a liquid coating composition for a spray applied, high solids, two component polyurethane, topcoat coating with a range of target gloss values for signage parts from 0°-100° GU at 60° angle, that utilizes the matting paste composition discussed above. The topcoat is typically applied over a primer, such as a polyurethane, epoxy or wash-primer.

In one embodiment, the coating composition comprises: a) a pigmented module, b) a matting paste composition, and c) a crosslinker module.

The pigmented module can comprise binders that have a crosslinkable component. The term "crosslinkable component" refers to a component having "crosslinkable functional groups" that are functional groups positioned in molecules of the compounds, oligomer, polymer, the backbone of the polymer, pendant from the backbone of the polymer, terminally positioned on the backbone of the polymer, or a combination thereof, wherein these functional groups are capable of crosslinking with crosslinking functional groups (during a curing step) to produce a coating in the form of crosslinked structures. One of ordinary skill in the art would recognize that certain crosslinkable functional group combinations would be excluded, since, if present, these combinations would crosslink among themselves (self-crosslink), thereby destroying their ability to crosslink with the crosslinking functional groups. A workable combination of crosslinkable functional groups refers to the combinations of crosslinkable functional groups that can be used in coating applications excluding those combinations that would self-crosslink.

Typical crosslinkable functional groups can include hydroxyl, thiol, isocyanate, thioisocyanate, acid or polyacid, acetoacetoxy, carboxyl, primary amine, secondary amine, epoxy, anhydride, ketimine, aldimine, or a workable combination thereof. Some other functional groups such as orthoester, orthocarbonate, or cyclic amide that can generate hydroxyl or amine groups once the ring structure is opened can also be suitable as crosslinkable functional groups.

The pigmented module can further comprise one or more pigments. Any pigments suitable for use in coating compositions can be used. Examples of pigments can include organic or inorganic pigments, effect pigment such as metallic pigments, metallic flakes, pearlescent pigments, and any other pigments known to or developed by those skilled in the art. The pigments can also include earth elements such as rare elements. Any combinations of the pigments can also be suitable. Transparent pigments or pigments having the same refractive index as the cured binder can also be used, for example, for clearcoats.

The pigmented module can further comprise organic solvents. Any typical organic solvents can be used, that are typical for the types of coating compositions described herein. Examples of solvents include, but not limited to, aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate and a combination thereof.

The crosslinker module can comprise a crosslinking component that crosslinks the binder contained in the pigmented module. The term "crosslinking component" refers to a component having "crosslinking functional groups" that are functional groups positioned in molecules of the compounds, oligomer, polymer, the backbone of the polymer, pendant from the backbone of the polymer, terminally positioned on the backbone of the polymer, or a combination thereof, wherein these functional groups are capable of crosslinking with the crosslinkable functional groups (during the curing step) to produce a coating in the form of crosslinked structures. One of ordinary skill in the art would recognize that certain crosslinking functional group combinations would be excluded, since, if present, these combinations would crosslink among themselves (self-crosslink), thereby destroying their ability to crosslink with the crosslinkable functional groups. A workable combination of crosslinking functional groups refers to the combinations of crosslinking functional groups that can be used in coating applications excluding those combinations that would self-crosslink. One of ordinary skill in the art would recognize that certain combinations of crosslinking functional group and crosslinkable functional groups would be excluded, since they would fail to crosslink and produce the film forming crosslinked structures. The crosslinking component can comprise one or more crosslinking agents that have the crosslinking functional groups.

Typical crosslinking functional groups can include hydroxyl, thiol, isocyanate, thioisocyanate, acid or polyacid, acetoacetoxy, carboxyl, primary amine, secondary amine, epoxy, anhydride, ketimine, aldimine, orthoester, orthocarbonate, cyclic amide or a workable combination thereof.

It would be clear to one of ordinary skill in the art that certain crosslinking functional groups crosslink with certain crosslinkable functional groups. Examples of paired combinations of crosslinkable and crosslinking functional groups can include isocyanate, thioisocyanate and melamine functional groups each crosslinking with hydroxyl, thiol, primary and secondary amine, ketimine, or aldimine functional groups.

The coating composition, for example, topcoats and/or clearcoats, can also include a reducer or activator component to adjust the liquid coating for optimal spay application characteristics.

The reducer component can be a blend of one or more solvents typically used in connection with topcoats to improve the spay characteristics of the coating. In embodiments of the invention, the reducer comprises one or more solvents chosen from methyl amyl ketone, n-butyl acetate, parachlorobenzotrifluoride, C-11 ketone, or combinations thereof. In embodiments of the invention, the reducer further comprises one or more pot life extenders. In one embodiment, the pot life extender is chosen from benzoic acid, 2,4-pentane dione, and a combination thereof.

In one embodiment, the pigmented module is a color pigment dispersion comprising:

one or more hydroxylated resins, one or more colored pigments, one or more wetting/dispersing aids, one or more solvents, and optionally, one or more rheology modifiers.

In one embodiment, the hydroxylated resin is chosen from polyester or acrylic film forming resins, or combinations thereof. In an embodiment, the colored pigment can be chosen from inorganic or organic, opaque or transparent, special effect pigments (e.g., aluminum or micas), or combinations thereof. In an embodiment, the rheology modifier can be chosen from fumed silica and/or polyurea.

In embodiments of the invention, the pigmented module can be prepared in accordance with Table 1, below.

TABLE 1

Colored Pigmented Dispersions: Unactivated

| Components | Wt %, Minimum | Wt %, Maximum |
|---|---|---|
| Hydroxylated Resins (on solids) | 22 | 56 |
| Colored Pigments | 4 | 59 |
| Solvents | 17 | 37 |
| Rheology Modifiers (on solids) | 0 | 1.4 |
| Wetting & Dispersing Aids (on solids) | 0 | 3 |

In embodiments of the invention, the pigmented module according to Table 1 can have total solids of about 62 to about 82 wt %.

The matting paste composition can be used with commercially available topcoat systems, such as, for example, BT Toners (colored pigment dispersion available from AkzoNobel) and GGP hardener (isocyanate based hardener available from AkzoNobel). The matting paste composition can also be used with commercially available clearcoat systems, such as, for example, BT LV650 (clearcoat available from AkzoNobel) and BT LV650 Hardener (isocyanate based hardener available from AkzoNobel).

In embodiments of the invention, the matting paste composition can further comprise a glyceride of ricinoleic acid (castor oil). Applicants have found that coatings made using the matting paste compositions (discussed above) that further comprise castor oil show improvement in ease of applying the liquid coating, the ability to recoat with a subsequent coating with good coating properties, and mar resistance. It was further found that when sufficient amounts of castor oil were included in the matting paste composition, the coaling exhibited self healing properties.

In embodiments of the invention, the matting paste composition can further comprise additional conventional coating additives in minor amounts, such as catalysts, flow agents, and rheology modifiers. In embodiments of the invention, the additional coating additives are present in an amount in the range from 0 to about 3%, or 0 to about 2.5%, based on the weight of matting paste composition.

In embodiments of the invention, the colored pigment dispersions and the matting paste composition are mixed together and then an isocyanate based hardener (crosslinker module) is added to cross-link the hydroxylated resins (introduced in the pigmented module). In one embodiment, the NCO:OH ratio in the mixed coating is in the range from about 0.8 to about 1.5. A reducer module can also be added to the mixture to produce a sprayable liquid coating composition.

In embodiments of the invention, the liquid coating composition is spray applied and may be air-dried or baked, e.g., at 60° C. to 80° C. The resulting coatings prepared in accordance with the invention have shown superior appearance in the low to satin gloss range, along with excellent application properties.

In embodiments of the invention, activated topcoat coatings using BT or Grip Guard Plus Toners can be prepared in accordance with Table 2 below.

TABLE 2

| Activated Topcoat Coatings | |
|---|---|
| Component | Wt % Range for T/C |
| POLYESTER POLYOL RESIN | 7-17 |
| ACRYLIC RESIN SOLUTION | 0-7.75 |
| Thermoplastic Acrylic Resin Solution | 7.9-11.1 |
| AMORPHOUS FUMED SILICA | 2.3-3.5 |

TABLE 2-continued

| Activated Topcoat Coatings | |
|---|---|
| Component | Wt % Range for T/C |
| CASTOR OIL | 2.0-3.0 |
| UV-ABSORBER | 0.8-1.3 |
| HINDERED AMINE LIGHT STABILISER | 0.65-0.95 |
| HDI HOMOPOLYMER SOLUTION | 8.3-9.8 |
| BENZOIC ACID | 0.11-0.13 |
| Parachlorobenzotrifluoride | 30.1-38.5 |
| Other Organic Solvents | 12-19 |
| Pigments | 1-21 |
| Additives | 1.2-3.35 |

Additives can include catalyst, flow modifiers, and rheology modifiers.

In embodiments of the invention, the components of the pigmented module, the matting paste composition, the cross-linker module and the reducer, can (depending on the selected color) be included in amounts that result in a ready to spray topcoat having a composition in accordance with Table 2. The amounts listed in Table 2 are based on topcoat formulations for the selected colors blue, silver, black and white.

The invention is further described and illustrated by the following examples. In these examples the compositions listed below are used as indicated.

| | |
|---|---|
| ACEMATT ® TS100 | amorphous untreated fumed silica based flattener available from Evonik; |
| Grip-Gard Plus ® B01 | matting paste containing extender pigments and PE/PTFE type waxes available from AkzoNobel; |
| Grip-Gard Plus ® B02 | matting paste containing PE/PTFE type waxes available from AkzoNobel; |
| Byk ® 306 | PDMS polyether modified available from Byk; |
| COROC ® A-7091 | acrylic flow agent available from Arkema; |
| EEP | ethyl 3-ethoxy propionate; |
| GGP hardener | isocyanate based hardener available from AkzoNobel; |
| LV650 Toner (BT Toners) | colored pigment dispersion available from AkzoNobel; |
| MAK | methyl amyl ketone; |
| METACURE T-12 | 10 wt % solution of dibutyl tin dilaurate in n-butyl acetate available from Air Products; |
| OXSOL ® 100 | parachlorobenzotrifluoride available from Mana; |
| Setalux ® 17-1261 | thermoplastic acrylic resin available from Nuplex; |
| TBA | t-butyl acetate; |
| Tinuvin ® 292 | hindered amine light stabilizer available from Ciba; |
| Tinuvin ® 328 | UV absorber available from Ciba; |

In the examples, mixing was performed using a high speed disperser (HSD) in some cases and a blade mixer (BM) in some cases. The HSD was a Bowers Equipment model #115 high speed disperser, using P-2 dual shear dispersion rotors. The BM was a Fawcett model 103A blade mixer, using an impeller blade.

The Reducer used to prepare the topcoats in the examples was a blend of solvents, as follows:

| Solvent: | Wt % |
|---|---|
| C-11 ketone | 12 |
| OXSOL ® 100 | 84 |
| benzoic acid | 4 |
| Total: | 100 |

The density of the Reducer was 1252 and the VOC was approximately 5.78 lbs/gal.

EXAMPLE 1

A matting paste composition with approximately 9% by weight loading of un-treated silica flattener, TS100, in a poor solvency solvent, Oxsol® 100, was prepared as follows, where wt % is based on the total matting paste composition:

| Process Steps/Component | Wt, % |
|---|---|
| The following components were mixed, using the HSD, at 1500 rpm speed: | |
| Setalux ® 17-1261 | 30.61 |
| EEP | 10.1 |
| A premix of the following components was made in a separate container, using the BM, at 1500 rpm speed: | |
| OXSOL ® 100 | 20.79 |
| Tinuvin ® 328 | 3.37 |
| The premix was dissolved completely and then added to the first mixture. | |
| Next, the following components were added under continued mixing using the HSD, at 1500 rpm speed: | |
| TBA | 17.62 |
| MAK | 2.77 |
| Tinuvin ® 292 | 2.59 |
| Mixing was continued for 15 minutes, then the following flattener was slowly added, in small portions, allowing the flattener to wet out at intervals: | |
| ACEMATT ® TS100 | 8.95 |
| After all flattener was added, mixing was continued using the HSD on high at 2000-3500 rpm for 2-hrs. The mixture was then ground to 40-45 microns on a Hegman grind block. | |
| Afte the grinding step, the following components were added under continued mixing using the HSD at 1500 rpm speed: | |
| Byk ® 306 | 0.59 |
| COROC ® A-7091 | 1.40 |
| METACURE T-12 | 1.18 |

EXAMPLE 2

A matting paste composition with approximately 9% by weight loading of un-treated silica flattener, TS100, in a poor solvency solvent. Oxsol® 100, and with approximately 13.8 wt % castor oil, was prepared as follows, where wt % is based on the total matting paste composition:

| Process Steps/Component | Wt, % |
|---|---|
| The following components were mixed, using the HSD, at 1500 rpm speed: | |
| Setalux ® 17-1261 | 26.39 |
| EEP | 8.72 |
| A premix of the following components as made in a separate container, using the BM, at 1500 rpm speed: | |
| OXSOL ® 100 | 17.94 |
| Tinuvin ® 328 | 2.90 |
| The premix was dissolved completely and then added to the first mixture. | |
| Next, the following components were added under continued mixing using the HSD, at 1500 rpm speed: | |
| TBA | 15.19 |
| MAK | 2.39 |
| Tinuvin ® 292 | 2.23 |

-continued

| Process Steps/Component | Wt, % |
|---|---|
| Mixing was continued for 15 minutes, then the following flattener was slowly added, in small portions, allowing the flattener to wet out at intervals: | |
| ACEMATT ® TS100 | 7.72 |
| After all flattener was added, mixing was continued using the HSD on high at 2000-3500 rpm for 2-hrs. The mixture was then ground to 40-45 microns on a Hegman grind block. | |
| After the grinding step, the following components were added under continued mixing using the HSD at 1500 rpm speed: | |
| Byk ® 306 | 0.51 |
| COROC ® A-7091 | 1.21 |
| METACURE T-12 | 1.01 |
| Castor Oil | 13.79 |

EXAMPLE 3

A matting paste composition with approximately 9% by weight loading of un-treated silica flattener, TSI 00, in a poor solvency solvent, Oxsol® 100, and with approximately 7.4 wt % castor oil, was prepared as follows, where wt % is based on the total matting paste composition:

| Process Steps/Component | Wt, % |
|---|---|
| The following components were mixed, using the HSD, at 1500 rpm speed: | |
| Setalux ® 17-1261 | 28.34 |
| EEP | 9.37 |
| A premix of the following components was made in a separate container, using the BM, at 1500 rpm speed: | |
| OXSOL ® 100 | 19.27 |
| Tinuvin ® 328 | 3.12 |
| The premix was dissolved completely and then added to the first mixture. | |
| Next, the following components were added under continued mixing using the HSD, at 1500 rpm speed: | |
| TBA | 16.32 |
| MAK | 2.57 |
| Tinuvin ® 292 | 2.40 |
| Mixing was continued for 15 minutes, then the following flattener was slowly added, in small portions, allowing the flattener to wet out at intervals: | |
| ACEMATT ® TS100 | 8.29 |
| After all flattener was added, mixing was continued using the HSD on high at 2000-3500 rpm for 2-hrs. The mixture was then ground to 40-45 microns on a Hegman grind block. | |
| After the grinding step, the following components were added under continued mixing using the HSD at 1500 rpm speed: | |
| Byk ® 306 | 0.54 |
| COROC ® A-7091 | 1.30 |
| METACURE T-12 | 1.0 |
| Castor Oil | 7.41 |

EXAMPLE 4

2K polyurethane liquid topcoats were prepared using the matting paste compositions according to examples 1-3.

The liquid topcoats were prepared by mixing an LV650 Toner component with the matting paste composition, and then mixing in a GGP hardener component and the Reducer component, by hand stirring. The mixing ratios were according to Table 3 below:

TABLE 3

Satin Topcoats - 2K Polyurethane Liquid Coatings (mixing ratios)

| Item | Mix ratio of Toner:Matting Paste Ex. 2 (wt ratio) | RTS mix ratio, (volume ratio) (Toner + Matting Paste):Hardener:Reducer |
|---|---|---|
| Blue | 40:60 | 3:1:1 |
| Red | 40:60 | 3:1:1 |
| White | 60:40 | 4:1:0.5 |
| Black | 30:70 | 3:1:1 |
| Green | 40:60 | 4:1:0.5 |
| Yellow | 40:60 | 3:1:0.5 |
| Silver | 60:40 | 2.5:1:0.5 |

EXAMPLE 5

Test panels were prepared using samples of the 2K polyurethane topcoats according to Example 4. The liquid topcoat was spay applied onto vertical 18"×36" un-sanded coil coated panels using a Sata 3000 RP 1.3 mm tip spray gun to a coating thickness of approximately 1.8 to 3.0 mils. The panels were dried by baking at 60° C. until dry. The resulting coated panels all had a satin gloss level in the range of 20-40 gloss units at 60° angle. The metallic coatings read higher gloss due to the presence of flake.

EXAMPLES 6-8

Additional test panels were prepared in a similar manner to Examples 4 and 5, except that commercially available matting pastes B01 and B02 were used instead of the matting paste compositions according to Examples 1-3 with Grip Guard Plus. Evaluation numbers for the test parameter ranges from 1-10, with 10 being the best.

EXAMPLE 6

Performance of a single stage topcoat made using LV650 red toner with Example 2 matting paste was compared a single coat topcoat made using GGP red toner with B01 matting paste. The results are shown below in Table 4:

TABLE 4

LV650 Red Toner using Matting Paste-Example 2 versus B01

| Color (Red) | Application Rating 1st coat | Application Rating 2nd coat | 60° Gloss | Film Builds |
|---|---|---|---|---|
| Example 2 Matting Paste | 8 | 7 | 23.4 | 1.7-2.2 |
| B01 Matting Paste | 8 Grainy | 8 | 35.2 | 2.0-2.5 |

The topcoat using the Example 2 matting paste had excellent appearance, while the topcoat using the B01 matting paste had grainy appearance on first coat.

EXAMPLE 7

Performance of a single stage topcoat made using LV650 Pepsi® blue toner with Example 2 matting paste was compared with single stage topcoats made using GGP Pepsi® blue toner with B01 and B02 matting pastes, respectively. The results are shown below in Table 5:

TABLE 5

Blue Color using Matting Paste - Example 2 versus B01 and B02 Matting Pastes

| Matting Paste used with Color: Pepsi Blue | Application Rating 1st coat | Application Rating 2nd coat | 60° Gloss | Hardness after bake | Flow after bake | Blotchiness after bake | Mar after bake |
|---|---|---|---|---|---|---|---|
| Example 2 | 8.5 | 8.5 | 24.6 | 6 | 8 | 8 | 9 |
| B01 | 6.5 | 6 | 34.8 | 8.5 | 7 | 5 | 9.5 |
| B02 | 8 | 7 | 10.3 | 8.5 | 9 | 9 | 8 |

Note:
Blotchiness = Even gloss of coatings

The topcoat made using the Example 2 matting paste exhibited self healing properties.

EXAMPLE 8

Performance of a single stage topcoats made using LV650 red and silver toners with Example 2 matting paste was compared to evaluate consistency of the coating for application by two different application specialists. The results are shown below in Table 6:

TABLE 6

| Comparison of 2 colors using Matting Paste - Ex. 2 for two application specialists | | | | | | | |
|---|---|---|---|---|---|---|---|
| Applicators | Application Rating 1st/2nd Coat | Blotchiness (Even Gloss) | Flow | Mar | Metal Orientation | 60° Gloss | Film Builds |
| Red | | | | | | | |
| 1 | 8.5/8 | 7.5 | 9 | 7 | | 18.7 | 2.0-2.6 |
| 2 | | | | | | 18.2 | 1.6-2.2 |
| Silver | | | | | | | |
| 1 | 8/8 | 9 | 7 | 7 | 9 | 67.0* | 2.3-2.8 |
| 2 | | | | | | 70.3* | 2.1-2.3 |

*False reading due to metallics.

The test panels showed excellent metal orientation, and consistency in gloss from the both application specialists, as well as a very wide film build.

EXAMPLE 9

A matting paste composition with approximately 12% by weight loading of un-treated silica flattener, TS100, in a poor solvency solvent, Oxsol® 100, for providing flattening for clear coat systems was prepared as follows, where wt % is based on the total matting paste composition:

| Process Steps/Component | Wt, % |
|---|---|
| The following components were mixed, using the HSD, at 1500 rpm speed: | |
| Setalux ® 17-1261 | 20.33 |
| A premix of the following components was made in a separate container, using the BM, at 1500 rpm speed: | |
| OXSOL ® 100 | 55.04 |
| Tinuvin ® 328 | 6.04 |
| The premix was dissolved completely and then added to the first mixture. Next, the following components were added under continued mixing using the HSD, at 1500 rpm speed: | |
| Tinuvin ® 292 | 6.04 |
| Mixing was continued for 15 minutes, then the following flattener was slowly added, in small portions, allowing the flattener to wet out at intervals: | |
| ACEMATT ® TS100 | 12.1 |
| After all flattener was added, mixing was continued using the HSD on high at 2000-3500 rpm for 2-hrs. The mixture was then ground to 40-45 microns on a Hegman grind block. | |

EXAMPLE 10

2K polyurethane liquid clearcoats were prepared using the matting paste composition according to example 9. The liquid clearcoats were prepared by mixing commercially available clearcoat systems with the matting paste composition. The mixing ratios were according to Table 7 below.

Test panels were made in accordance with commercial practice for the various commercial clearcoat. Test results are also shown below in Table 7.

TABLE 7

| Low Gloss Clears made from matting paste (MP) according to Ex. 9 | | | | | | |
|---|---|---|---|---|---|---|
| Clearcoat | Hardener | Reducer | Mix Ratio (volume): Clear:Hardener:Reducer:MP | Viscosity, #4 DIN | DFT mils | 60° Gloss |
| Energy Pro250, 480559 | 480560 | 480562 | 3:1:1:3. 240 mls + 50 mls Oxsol 100 | 16.27 | 2.1-2.3 | 33.9 |
| ACIII, 381164 | Standard Hardener, 387160 | Standard Activator, 385062 | 100:50:30:200 190 mls + 80 mls Oxsol 100 | 15.61 | 1.8-2.0 | 1.3 |
| Autoclear HS + LV, 390836 | HS + LV, 390837 | HS + LV Act. Med, 397232 | 3:1:1:3 240 mls + 100 mls Oxsol 100 | 15.71 | 1.8-2.1 | 3.6 |
| LV650, 480989 | LV650 Hardener, 397309 | LV650 Reducer Med, 480495 | 5:2:2:5 210 mls + 60 mls Oxsol 100 | 16.17 | 2.2-2.5 | 10.9 |

A review of Table 7 reveals that the matting paste can be used to flatten commercially available high gloss clearcoats. Excellent appearance was achieved. Gloss level could be adjusted by the level of Matting Paste used.

Based on the Examples, the following observations were made regarding the matting paste:

- Matting Paste allows for easy dispersion of pyrogenic or untreated silica (TS100) in solvents with poor "solvency" such as PCBTF (Oxsol). Therefore, Low Gloss Coating systems which are VOC compliant are made.
- Extremely high loading of TS100 is achievable 9-12 wt % of the matting paste. This resulted in excellent coverage when mixed with high solids pigment dispersions and a satin finish in the gloss range of 20-40° GU at 60° angle. Such high loading of TS100 was not possible prior matting paste formulations due to sharp viscosity increase beyond 6% wt.
- Matting paste compositions according to the invention are stable upon standing and flattener does not re-agglomerate.
- Solids content of the matting paste composition can exceed 28%, or even 36%, by weight.
- The matting paste composition achieved VOC compliancy and compatibility with high solids colored pigment dispersions without the use of extender pigments.
- The matting paste composition is compatible with high solids colored pigment dispersions (>60% solids) made with organic and inorganic pigments (e.g., blacks, reds, yellows, blues, metallics, whites, etc), allowing for easy mixing by hand.

Based on the Examples, the following observations were made regarding the topcoats made using matting paste composition according to the invention:

- Very even gloss and/or non-blotchy appearance.
- Very "clean" looking metallics and solid color appearance, with a high degree of clarity.
- Minimal color shift between a high gloss system and satin finish using the matting paste, when using the same colorant mix. In contrast, a significant color shift was observed when matting pastes with extender pigments (e.g., B01) are used. It is believed this was due to the "dirtying" effect from the extenders.
- Very easy application of the topcoats made with the matting paste composition according to the invention.
- Topcoats made with the matting paste composition according to the invention maintained gloss consistency at a wide film build range.
- Topcoats made with the matting paste composition according to the invention maintained gloss consistency at different temperature and humidity conditions.
- Topcoats made with the matting paste composition according to the invention exhibited excellent mar resistance without the use of PE/PTFE type waxes.

What is claimed is:

1. A matting paste composition comprising:

a) a styrene, methyl methacrylate and/or butyl methacrylate thermoplastic non-hydroxy-functional acrylic resin having a weight average molecular weight in the range from about 50,000 to about 100,000 and present in an amount in the range of from about 15 to about 35%, based on the total weight of the matting paste composition;

b) hindered amine light stabilizer present in an amount in the range of from about 1.5 to about 8%, based on the total weight of the matting paste composition;

c) UV absorber present in an amount in the range of from about 2 to about 8%, based on the total weight of the matting paste composition;

d) amorphous, untreated fumed silica, flattener present in an amount in the range of from about 7 to about 13%, based on the total weight of the matting paste composition;

e) one or more organic solvents present in an amount in the range of from 40 to 60%, based on the total weight of the matting paste composition;

f) from about 2% to about 14% castor oil based on the total weight of the matting paste composition, wherein the castor oil is a triglyceride of 90% ricinoleic acid, having a molecular weight of about 900, a refractive index of 1.4775, and an OH value of 164; and g) wherein the matting paste composition is used to prepare a 2K polyurethane coating having a gloss in the range of 15 to 45 gloss units at 60° angle.

2. The matting paste according to claim 1, wherein the matting paste composition is free of extender pigments.

3. The matting paste according to claim 1, wherein the styrene, methyl methacrylate and/or butyl methacrylate thermoplastic non-hydroxy-functional acrylic resin has a Tg in the range of from 50-100° C.

4. The matting paste according to claim 1, wherein the hindered amine light stabilizer is selected from the group consisting of Bis (1,2,2,6,6-pentamethyl-4-piperidyl) sebacate, methyl (1,2,2,6,6-pentamethyl-4-piperidyl) sebacate, and combinations thereof.

5. The matting paste according to claim 1, wherein the UV absorber is a benzotriazol type absorber.

6. The matting paste according to claim 1, wherein the organic solvent is selected from the group consisting of t-butyl acetate, parachlorobenzotrifluoride, methyl amyl ketone, ethyl 3-ethoxy propionate, and combinations thereof.

7. A liquid coating composition comprising the matting paste composition according to claim 1.

8. A liquid coating composition according to claim 7, wherein the coating composition is a topcoat or a clearcoat.

9. A matting paste composition comprising:

a) a styrene, methyl methacrylate and/or butyl methacrylate thermoplastic styrene non-hydroxy-functional acrylic resin having a weight average molecular weight in the range from about 50,000 to about 100,000 and present in an amount in the range of from about 15 to about 35 %, based on the total weight of the matting paste composition;

b) hindered amine light stabilizer present in an amount in the range of from about 1.5 to about 8%, based on the total weight of the matting paste composition;

c) UV absorber present in an amount in the range of from about 2 to about 8%, based on the total weight of the matting paste composition;

d) amorphous, untreated fumed silica, flattener present in an amount in the range of from about 7 to about 13%, based on the total weight of the matting paste composition; and e) one or more organic solvents present in an amount in the range of from 40 to 60%, based on the total weight of the matting paste composition.

10. The matting paste according to claim 9, wherein the matting paste composition is free of extender pigments.

11. The matting paste composition according to claim 9, further comprising an additive selected from the group consisting of castor oil, a low Tg acrylic or polyester, and combinations thereof.

12. The matting paste according to claim 9, wherein the styrene, methyl methacrylate and/or butyl methacrylate thermoplastic non-hydroxy-functional acrylic resin has a Tg in the range of from 50-100° C.

13. The matting paste according to claim 9, wherein the hindered amine light stabilizer is selected from the group consisting of Bis (1,2,2,6,6-pentamethyl-4-piperidyl) sebacate, methyl (1,2,2,6,6-pentamethy -4-piperidyl) sebacate, and combinations thereof.

14. The matting paste according to claim 9, wherein the UV absorber is a benzotriazol type absorber.

15. The matting paste according to claim 9, wherein the organic solvent is selected from the group consisting of t-butyl acetate, PCBTF, MAK, EEP, and combinations thereof.

16. A liquid coating composition comprising the matting paste composition according to claim 9.

17. A liquid coating composition according to claim 16, wherein the coating composition is a 2K polyurethane coating having a gloss in the range of 0 to 60 gloss units at 60° angle.

18. A liquid coating composition according to claim 16, wherein the coating composition is a topcoat or a clearcoat.

* * * * *